United States Patent
Karbasi et al.

(10) Patent No.: US 6,437,063 B1
(45) Date of Patent: Aug. 20, 2002

(54) PROCESS FOR PREPARING POLYPROPYLENE

(75) Inventors: Amir Karbasi, Espoo; Pauli Leskinen, Helsinki; Pirjo Jääskeläinen, Porvoo; Bo Malm, Espoo; Päivi Pitkänen, Halkia, all of (FI); Mika Härkönen, Porgrunn; John Haugen, Stathelle, both of (NO)

(73) Assignee: Borealis Technology Oy, Porvoo (FI)

(*) Notice: Subject to any disclaimer, the term of this patent is extended or adjusted under 35 U.S.C. 154(b) by 6 days.

(21) Appl. No.: 09/530,689

(22) PCT Filed: Nov. 9, 1998

(86) PCT No.: PCT/FI98/00866

§ 371 (c)(1),
(2), (4) Date: Jun. 23, 2000

(87) PCT Pub. No.: WO99/24478

PCT Pub. Date: May 20, 1999

(30) Foreign Application Priority Data

Nov. 7, 1997 (FI) .................................................. 974175

(51) Int. Cl.[7] .............................................. C08F 32/00
(52) U.S. Cl. ...................... 526/128; 526/351; 526/160; 526/943; 526/904; 526/158; 526/97
(58) Field of Search ................. 526/351, 308, 526/160, 943, 904, 158, 97

(56) References Cited

U.S. PATENT DOCUMENTS

| | | | | |
|---|---|---|---|---|
| 4,551,501 A | * | 11/1985 | Shinga et al. | 525/88 |
| 4,767,735 A | * | 8/1988 | Ewen et al. | 502/109 |
| 5,234,879 A | | 8/1993 | Garoff et al. | |
| 5,641,721 A | | 6/1997 | Pentti et al. | |
| 5,733,989 A | | 3/1998 | Pentti et al. | |
| 6,040,260 A | | 3/2000 | Pentti et al. | |

FOREIGN PATENT DOCUMENTS

| | | |
|---|---|---|
| EP | 0151883 B1 | 8/1985 |
| EP | 0152701 B1 | 8/1985 |
| EP | A2171199 | 2/1986 |
| EP | 0206515 A1 | 12/1986 |
| EP | A2321218 | 6/1989 |
| EP | 0368577 B1 | 5/1990 |
| EP | 0369658 A3 | 5/1990 |

(List continued on next page.)

OTHER PUBLICATIONS

Salamone, Joseph C., Polymeric Materials Encyclopedia, vol. 9 (1996) pp. 6602–6608.
"Ethylene–Propylene Elastomers", vol. 6, pp. 544–559.
Albizzati et al., "Macromol. Symp.", vol. 89, pp. 79–89 (1995).
Harkonen et al. "Makromol. Chem.", vol. 192, pp. 2857–2863, (1991).

Primary Examiner—David W. Wu
Assistant Examiner—Ling-Sui Choi
(74) Attorney, Agent, or Firm—Birch, Stewart, Kolasch & Birch, LLP

(57) ABSTRACT

The present invention concerns a process for producing a propylene polymer nucleated with a polymeric nucleating agent containing vinyl compound units. The method comprises modifying a catalyst by polymerizing a vinyl compound in the presence of said catalyst in a medium, which does not essentially dissolve the polymerized vinyl compound, and by continuing the polymerization of the vinyl compound until the concentration of unreacted vinyl compounds is less than about 0.5 wt-%. The thus obtained modified catalyst composition is used for polymerizing propylene optionally together with comonomers to produce in the presence of said modified catalyst composition. Modification of the catalyst according to the present invention will reduce production costs and provide highly reliable catalyst activity.

52 Claims, 1 Drawing Sheet

FOREIGN PATENT DOCUMENTS

| | | |
|---|---|---|
| EP | 0417319 B1 | 3/1991 |
| EP | 0411628 A2 | 6/1991 |
| EP | 0586109 A2 | 3/1994 |
| EP | A1607703 | 7/1994 |
| EP | 0627449 A1 | 12/1994 |
| WO | WO9219653 A1 | 11/1992 |
| WO | WO9219658 A1 | 11/1992 |
| WO | WO9426794 A1 | 11/1994 |
| WO | WO9512622 A1 | 5/1995 |
| WO | WO9812234 A1 | 3/1998 |

* cited by examiner

PROCESS FOR PREPARING POLYPROPYLENE

This application is the national phase under 35 U.S.C. §371 of PCT International Application No. PCT/FI98/00866 which has an International filing date of Nov. 9, 1998, which designated the United States of America.

BACKGROUND OF THE INVENTION

1. Field of the Invention

The present invention relates to propylene polymers. In particular, the present invention concerns a process for preparing efficiently nucleated propylene copolymers.

2. Description of Related Art

Propylene (PP) homo- and copolymers have excellent resistance to heat and chemicals as well as attractive mechanical properties, such as stiffness and impact resistance. However, processing of polypropylene by, e.g., injection moulding, thermoforming or blow moulding, to form thin-walled containers has resulted in products having insufficient stiffness, transparency and cycle time. This is caused by the semi-crystalline nature of polypropylene.

In the prior art it has been proposed to improve the stiffness, transparency and cycle time of moulded polypropylene by blending the polymer with various nucleating agents such as dibenzilidene sorbitol (DBS), sodium benzoate or di(alkylbenzilidene)sorbitol. These traditional nucleating agents tend to bleed out from the polymer composition during processing and many of them give rise to fumes with an offensive smell. As a solution to these problems, it has been suggested in the art to use vinyl compounds, such as polymers of vinyl cycloalkanes and 3-methyl-1-butene, as nucleating agents in the form of propylene copolymers or polypropylene compounds, cf. EP Patent Specifications Nos. 0 151 883, 0 152 701, 0 206 515, 0 368 577 0 369 658 and 0 417 319. EP Patent No.0 152 701 discloses prepolymerization of Ziegler-Natta catalysts with vinyl cyclohexane to provide a polymer slurry which is washed and distilled to produce a vinyl cyclohexane powder containing the active catalyst. The prepolymerized catalyst composition is then used for polymerization of propylene to form a propylene copolymers with improved stiffness and having a high degree of crystallinity and a high crystallization temperature.

There are some major problems associated with the prior art solutions using polymerized vinyl compounds for nucleation of polypropylene. Thus, the products contain impurities in the form of unreacted monomers and extensive washing of the product has to be carried out before the catalyst can be used. These washing steps will reduce that activity of the catalyst. In fact, the whole work-up of the prepolymerized catalyst, including separation of the catalyst from the polymerization medium, washing and drying, will cause extra costs and impair the activity of the catalyst.

Finally, it should be pointed out that it is known in the art to carry out prepolymerization using, e.g. vinyl cyclohexane, in a medium comprising a viscous substance (cf. Finnish Patent No. 95387). Due to the fact that, e.g., no washing, drying, sieving and transferring steps are needed, the catalyst activity is maintained.

SUMMARY OF THE INVENTION

It is an object of the present invention to eliminate the problems related to the prior art and to provide a novel process for preparing nucleated propylene polymers, i.e. propylene homopolymers, propylene copolymers and propylene random block polymers. In particular the present invention aims at improving the prior art of Finnish Patent No. 95387 (corresponds to EP Patent 0 607 703) while providing a process by which it is possible to prepare modified catalysts providing excellent nucleation of propylene polymers and containing essentially no reactant or solvent residues which would impair the long-term activity of the catalysts.

Further, it is an object of the present invention to provide a process for preparing propylene polymers which can be used in food contact packaging applications due to the fact that they do not contain any residues of taste- or odor-components.

It is still a further object of the present invention to provide extruded and moulded products comprising the present propylene homo- and copolymer compositions.

These and other objects, together with the advantages thereof over known processes and products, which shall become apparent from the specification which follows, are accomplished by the invention as hereinafter described and claimed.

The invention is based on providing a catalyst composition useful for polymerization of propylene optionally together with comonomers. The catalyst is modified by polymerizing a vinyl compound in the presence of said catalyst. The modification takes place in the medium in which the catalyst also is fed into the polymerization process. The medium is a liquid or a highly viscous hydrocarbon medium which does not dissolve the polymerized polymer. Further, the modification is accomplished in such a way that all or practically all of vinyl compound used for modification is consumed during polymerization. To reach that aim, the polymerization is continued at elevated temperature until the concentration of the unreacted vinyl compounds in the catalyst composition after polymerization is about 0.5 wt-%, preferably less than 2000 ppm by weight and in particular 1000 ppm by weight or less. The initial amount of reactant is also restricted to a maximum of up to three times the weight of the catalyst. The modification is carried out before any conventional, usually continuous prepolymerization with an olefinic monomer, to ensure that the polymerization of the vinyl compound is complete.

As a result of these features, the amount of reactant residues in the modified catalyst composition is small, and in the final polymer it is below limits of determination using the Gas Chromatography-Mass Spectrometry (GC-MS) method, which is less than 0.01 ppm by weight. Since the reaction medium does contain only very small amounts of unreacted reactant residues or dissolved polymer residues, no washing of the modified catalyst composition is needed before the catalyst is fed to polymerization.

More specifically, the invention is mainly characterized by a process for producing a propylene polymer nucleated with a polymeric nucleating agent containing vinyl compound units, comprising the steps of modifying a catalyst by: polymerizing a vinyl compound of the formula

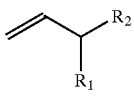

wherein $R_1$ and $R_2$ together from a 5 or 6 membered saturated or unsaturated or aromatic ring at a weight ratio of the vinyl compound to the catalyst amounting to 0.1 to below 3, in the presence of said catalyst, by carrying out the modification in a medium which does not essentially dissolve the polymerized vinyl compound and by continuing the polymerization of the vinyl compound until the concentration of unreacted vinyl compounds is less than 0.5 wt-%, to produce a modified catalyst composition, said modification being carried out essentially before any prepolymerization step of the catalyst with an olefinic monomer, and polymerizing propylene optionally together with comonomers in the presence of said modified catalyst composition.

The invention achieves a number of considerable advantages. Modification of the catalyst by using it for polymerization of vinyl compounds in the liquid or highly viscous medium described above will reduce production costs because higher capacities can be used and no wastes are formed. Reliability of the catalyst activity is good because this modification is a part of the polymer production and no kind of transferring, drying or sieving is needed.

Because the final products do not contain harmful residues of the vinyl compounds, the propylene polymers manufactured by the present invention have a broad range of application.

Although the use of certain types of external donors will yield interesting and valuable effects on the polymers produced, as explained in our copending patent application, by means of the present invention it is also possible to produce a modified catalyst composition with high and enduring activity without any external donor.

By using the modified catalyst compositions of the present invention, propylene polymers can be prepared having a Melt Flow Rate (MFR$_2$) of 0.01 to 1000 g/10 min (measured by ISO Standard 1133, at 230° C., 2.16 kg load) and a T$_{cr}$ of over 7° C. higher than the T$_{cr}$ of the corresponding non-nucleated polymer. The crystallinity of propylene homopolymers is generally over 48%.

The present process can be employed for producing propylene polymers which are useful in many different kinds of polymer articles. Propylene polymers produced according to the invention can be used in pelletized or non-pelletized form as will be discussed later in this application. Particular advantages are obtained by applying the polymers preferably blended or compounded with other components for the manufacture of moulded and extruded products.

Next, the invention will be more closely examined with the aid of the following detailed description with reference to the attached drawing.

DETAILED DESCRIPTION OF THE INVENTION

Figure 1:
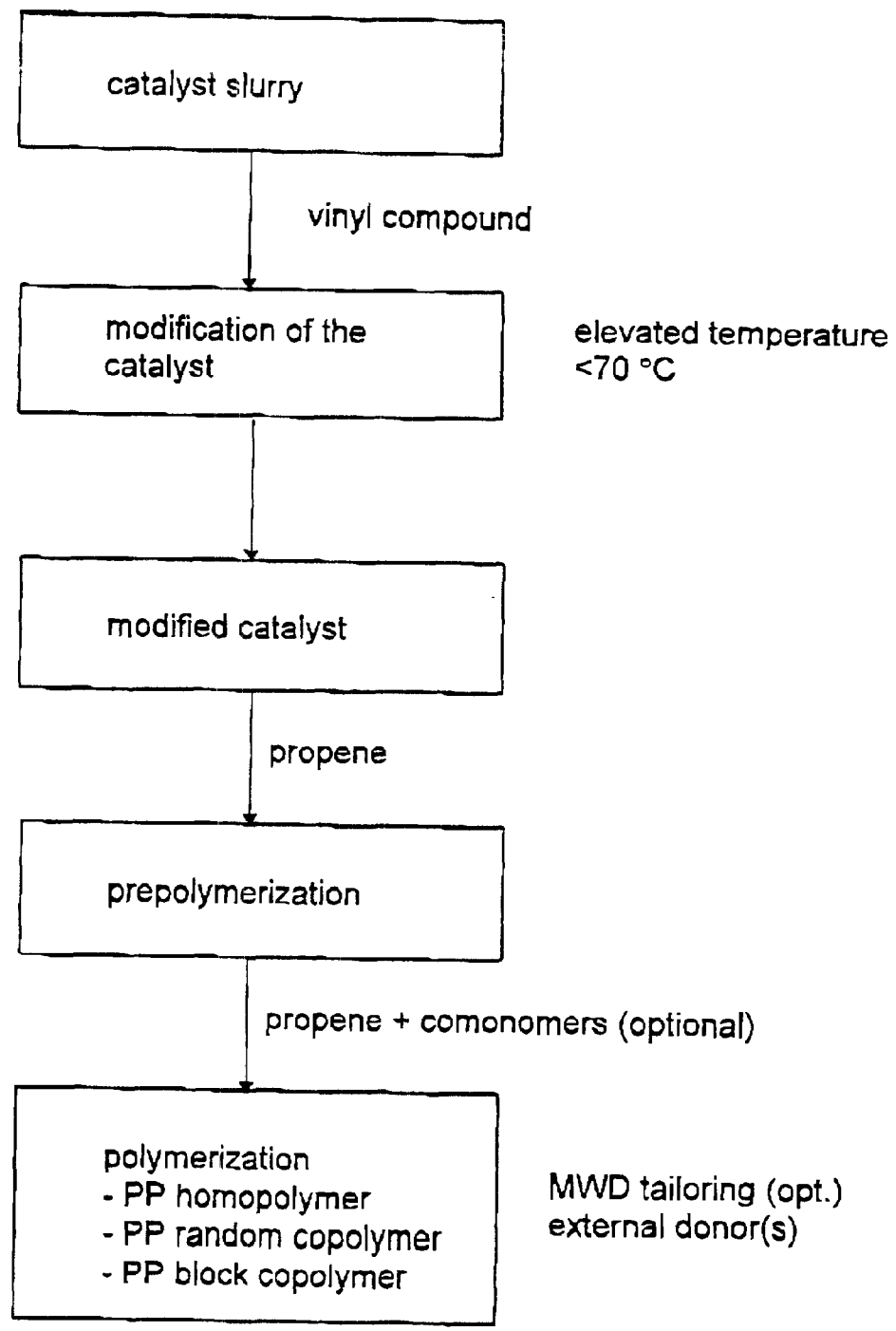
FIG. 1 shows the block diagram of a process according to an embodiment of the present invention.

Generally, the process according to the present invention for producing a propylene polymer nucleated with a polymeric nucleating agent containing vinyl compound units comprises the steps of modifying a catalyst by polymerizing a vinyl compound in the presence thereof to provide a modified catalyst composition, prepolymerizing the modified catalyst composition with propylene and/or other 1-olefin(s) and polymerizing propylene optionally together with comonomers in the presence of said prepolymerized, modified catalyst composition. The vinyl compound modification step is thus carried out as a first treatment before any prepolymerization with an olefin monomer.

The above steps are also depicted in somewhat more detail in the attached drawing. Thus, according to the embodiment shown in the block diagram, the catalyst is first slurried in a suitable medium, then the vinyl compound is added and subjected to polymerization in the presence of the catalyst at an elevated temperature of less than 70° C. to provide a modified catalyst. The thus obtained catalyst composition is prepolymerized with propylene (or another 1-olefin) and then the prepolymerized catalyst composition is used for catalyzing polymerization of propylene optionally with comonomers. Prepolymerization here means a usually continuous process step, prior to the main polymerization step(s), wherein the catalyst is polymerized with olefin(s) to a minimum degree of 10 g polyolefin per 5 g of the catalyst. The polymers prepared comprise propylene homopolymers, propylene random copolymers and propylene block copolymers. Depending on the desired properties of the propylene polymer, the molar mass distribution thereof can be tailored as described below. The polymerization can be carried out in the presence of specific external donors to provide polymers of high stiffness.

In the following, the main features of the invention are discussed in greater detail.

The vinyl compounds used for catalyst modification by polymerization are represented by the formula

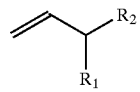

wherein R$_1$ and R$_2$ together form a 5 or 6 membered saturated or unsaturated or aromatic ring or they stand independently for a lower alkyl comprising 1 to 4 carbon atoms.

The following specific examples of vinyl compounds can be mentioned: vinyl cycloalkanes, in particular vinyl cyclohexane (VCH), vinyl cyclopentane, vinyl-2-methyl cyclohexane and vinyl norbornane, 3-methyl-1-butene, styrene, p-methyl-styrene, 3-ethyl-1-hexene or mixtures thereof. VCH is a particularly preferred monomer.

For the purpose of the present invention "nucleated propylene polymer" stands for a polymer having an increased and controlled degree of crystallinity and a crystallization temperature which is at least 7° C., preferably at least 10° C. and in particular over 13° C. higher than the crystallization temperature of the corresponding non-nucleated polymer. Using high-yield Ziegler-Natta catalysts, the crystallization temperature of a nucleated propylene homopolymer is higher than 120° C., preferably over 124° C. and in particular over 126° C., and crystallinity is over 50%.

The nucleated propylene polymers or copolymers contain about 0.0001 to 1%, preferably 0.0001 to 0.1%, in particular 0.0001 to 0.01% (calculated from the weight of the composition) of the above-mentioned polymerized vinyl compound units.

According to the present invention, modification of the catalyst by polymerizing it with a vinyl compound, such as VCH, is performed in an inert fluid which does not dissolve the polymer formed (e.g. poly VCH).

One particularly preferred polymerization medium comprises a viscous substance, in the following a "wax", such as an oil or a mixture of an oil with a solid or highly viscous substance (oil-grease). The viscosity of such a viscous substance is usually 1,000 to 15,000 cP at room temperature. The advantage of using wax is that the catalyst can be modified, stored and fed into the process in the same media and catalyst wax preparation and modification of the catalyst is performed in the same process device. As mentioned above, since no washing, drying, sieving and transferring are needed, the catalyst activity is maintained.

The weight ratio between the oil and the solid or highly viscous polymer is preferably less than 5:1.

In addition to viscous substances, liquid hydrocarbons, such as isobutane, propane, pentane and hexane, can also be used.

The polypropylenes produced with a catalyst modified with polymerized vinyl compounds should contain essentially no free (unreacted) vinyl compounds. This means that the vinyl compounds should be completely reacted in the polymerization step. To that end, the weight ratio of the (added) vinyl compound to the catalyst should be in the range of 0.05 to less than 3, preferably about 0.1 to 2.0, and in particular about 0.1 to 1.5.

Further, the reaction time of the catalyst modification by polymerization of a vinyl compound should be sufficient to allow for complete reaction of the vinyl monomer. Generally, when operating on an industrial scale, a polymerization time of at least 30 minutes is required, preferably the polymerization time is at least 1 hour and in particular at least 5 hours. Polymerization times even in the range of 6 to 50 hours can be used. The modification can be done at temperatures of 10 to 70° C., preferably 35 to 65° C.

Analysis of catalyst compositions prepared according to the present invention has shown that the amount of unreacted vinyl compounds in the reaction mixture (including the polymerization medium and the reactants) is less than 0.5 wt-%, in particular less than 2000 ppm by weight. Thus, when the prepolymerized catalyst contains a maximum of about 0.1 wt-% vinyl compound, the final vinyl compound content in the polypropylene will be below the limit of determination using the GC-MS method (<0.01 ppm by weight).

As catalyst any stereospecific catalyst for propylene polymerization can be used, which is capable of catalyzing polymerization and copolymerization of propylene and comonomers at a pressure of 5 to 100 bar, in particular 25 to 80 bar, and at a temperature of 40 to 110° C., in particular 60 to 110° C. Ziegler-Natta as well as metallocene catalysts, can be used.

Generally, the Ziegler-Natta catalyst used in the present invention comprises a catalyst component, a cocatalyst component, an external donor, the catalyst component of the catalyst system primarily containing magnesium, titanium, halogen and an internal donor.

As mentioned above, the present invention also provides for modification of the catalyst without the use of any external donor.

The catalyst preferably contains a transition metal compound as a procatalyst component. The transition metal compound is selected from the group of titanium compounds having an oxidation degree of 3 or 4, vanadium compounds, zirconium compounds, chromium compounds, cobalt compounds, nickel compounds, tungsten compounds and rare earth metal compounds, titanium trichloride and titanium tetrachloride being particularly preferred.

Examples of suitable catalyst systems are described in, for example, Finnish Patents Nos. 86866, 96615 and 88047 and 88048.

One particularly preferable catalyst, which can be used in the present invention, is disclosed in FI Patent No. 88047. Another preferred catalyst is disclosed in Finnish Patent Application No. 963707.

A catalyst system useful in the present process can be prepared by reacting a magnesium halide compound with titanium tetrachloride and an internal donor. The magnesium halide compound is, for example, selected from the group of magnesium chloride, a complex of magnesium chloride with a lower alkanol and other derivatives of magnesium chloride.

$MgCl_2$ can be used as such or it can be combined with silica, e.g. by absorbing the silica with a solution or slurry containing $MgCl_2$. The lower alkanol used can be preferably methanol or ethanol, particularly ethanol.

The titanium compound used in the preparation of the procatalyst is preferably an organic or inorganic titanium, compound, having an oxidation state of titanium of 3 or 4. Also other transition metal compounds, such as vanadium, zirconium, chromium, molybdenum and tungsten compounds can be mixed with the titanium compound. The titanium compound usually is halide or oxyhalide, an organic metal halide, or a purely metal organic compound, in which only organic ligands have been attached to the transition metal. Particularly preferable are the titanium halides, especially $TiCl_4$. Preferably the titanation is carried out in two or three steps.

The Ziegler-Natta catalyst used can also be a heterogeneous unsupported $TiCl_3$-based catalyst. This kind of catalysts are typically solid $TiCl_3$ in a delta crystalline form which are activated with aluminium-chloride-alkyls, such as diethylaluminiumchloride. The solid $TiCl_3$ catalysts are typically prepared by reduction of $TiCl_4$ with aluminium-alkyls and/or aluminium-chloride-alkyls, possibly combined with heat treatment to maximise the desired delta crystalline form of $TiCl_3$. The performance, especially stereospecificity, of these catalyst can be improved by using Lewis-bases (electron donors), such as esters, ethers or amines.

One particularly attractive catalyst type comprises a transesterified catalyst, in particular a catalyst transesterified with phthalic acid or its derivatives (cf. the Finnish patents mentioned above). The alkoxy group of the phthalic acid ester used in the transesterified catalyst comprises at least five carbon atoms, preferably at least 8 carbon atoms. Thus, as the ester can be used for example propylhexyl phthalate, dioctyl phthalate, dinonyl phthalate, diisodecyl phthalate, di-undecyl phthalate, ditridecyl phthalate or ditetradecyl phthalate.

The partial or complete transesterification of the phthalic acid ester can be carried out e.g. by selecting a phthalic acid ester—a lower alcohol pair, which spontaneously or with the aid of a catalyst, which does not damage the procatalyst composition, transesterifies the catalyst at an elevated temperatures. It is preferable to carry out the transesterification at a temperature, which lies in the range of 110 to 150° C., preferably 120 to 140° C.

The catalyst prepared by the method above is used together with an organometallic cocatalyst and with an external donor. Generally, the external donor has the formula IV

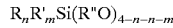

wherein
R and R' can be the same or different and they stand for a linear, branched or cyclic aliphatic, or aromatic group;
R" is methyl or ethyl;
n is an integer 0 to 3;
m is an integer 0 to 3; and
n+m is 1 to 3.

The aliphatic groups in the meanings of R and R' can be saturated or unsaturated. Linear $C_1$ to $C_{12}$ hydrocarbons include methyl, ethyl, propyl, butyl, octyl and decanyl. As examples of suitable saturated branched $C_{1-8}$ alkyl groups, the following can be mentioned: isopropyl, isobutyl, isopentyl, tert-butyl, tert-amyl and neopentyl. Cyclic aliphatic groups containing 4 to 8 carbon atoms comprise, e.g., cyclopentyl, cyclohexyl, methyl cyclopentyl and cycloheptyl.

According to the present invention, the donors used can be strongly coordinating donors which form relatively strong complexes with catalyst surface, mainly with $MgCl_2$ surface in the presence of aluminium alkyl and $TiCl_4$. The donor components are characterised by a strong complexation affinity towards catalyst surface and a sterically large and protective hydrocarbon (R'). Strong coordination with $MgCl_2$ requires oxygen-oxygen distance of 2.5 to 2.9 Å [Albizzati et al., Macromol. Symp. 89 (1995) 73–89].

Typically this kind of donors has the structure of the general formula II

$R'''_nSi(OMe)_{4-n}$ wherein R''' is a branched aliphatic or cyclic or aromatic group, and n is 1 or 2, preferably 2. [Härkönen et al., Macromol. Chem. 192 (1991) 2857–2863].

Another group of such donors are 1,3-diethers having the formula III

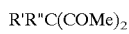

$R'R''C(COMe)_2$ wherein R' and R" are the same or different and stand for a linear branched aliphatic or cyclic or aromatic group.

In particular, the external donor is selected from the group consisting of dicyclopentyl dimethoxysilane, diisopropyl dimethoxysilane, methylcyclodimethoxy silane, di-isobutyl dimethoxysilane, and di-t-butyl dimethoxysilane.

An organoaluminum compound is used as a cocatalyst. The organoaluminium compound is preferably selected from the group consisting of trialkylaluminium, dialkyl aluminium chloride and alkyl aluminium sesquichloride.

The metallocene catalyst comprises a metallocene/activator reaction product impregnated in a porous support at maximum internal pore volume. The catalyst complex comprises a ligand which is typically bridged, and a transition metal of group IVA . . . VIA, typically a metal halide, and aluminium alkyl. The ligands can belong to group of heterocyclic substituted or unsubstituted compounds, e.g. indocenes, naftenes, or any other bulky compound which can control the stereoselectivity of the catalyst especially when ligands are bridged together with silane or other chemical bond. The activator is selected from a group in which are derivates of water and aluminium alkyls e.g. trimethyl aluminium, triethyl aluminium, and tri t-butyl aluminium, or another compound capable of activating the complex. The metallocene/activator reaction product, a solvent capable of dissolving it, and a porous support are brought into mutual contact, the solvent is removed and the porous support is impregnated with the metallocene/activator reaction product, the maximum amount of which corresponds to the pore volume support, cf. International PCT Application No. PCT/FI94/00499.

One typical structure of metallocene compound having decreased sensitivity to chain transfer reactions is a bridged bis(2-R-4-R'-indenyl) M $Cl_2$, wherein both R and R' are aliphatic, cycloaliphatic or aromatic hydrocarbons having 1 to 18 C atoms, R' is typically benzyl, phenyl or naphthyl, and R is typically methyl or ethyl. M is a transition metal, typically titanium, zirconium or hafnium. R and R' may contain heteroatoms, such as silicon, nitrogen, phosphorous or germanium. The bridge between the indenyls is made from 1 to 3 atoms, such as carbon, silicon, nitrogen, phosphorous or germanium. A typical bridge is dimethylsilyl or ethyl. Example of such metallocene compounds are dimethylsilyl-bis(2-methyl-4-phenyl-indenyl)zirconium dichloride and dimethylsilyl-bis(2-methyl-4,5-benzyl-indenyl) zirconiumdichloride.

In practice, the modification of the catalyst is carried out by feeding the catalyst, the cocatalyst and the donor, if any, in desired order into a stirred (batch) reactor. It is preferred to feed the cocatalyst first to remove any impurities. It is also possible first to add the catalyst and then the cocatalyst optionally with the donor.

Then, the vinyl compound is fed into the reaction medium. The weight ratio of the vinyl compound to the catalyst is less than 3, preferably 2 or less. The vinyl compound is reacted with the catalyst until all or practically all of the vinyl compound has reacted. As mentioned above, a polymerization time of 1 hour represents a minimum on an industrial scale, usually the reaction time should be 5 hours or more.

After the reaction, the modified catalyst can be separated from the reaction medium or the content of the entire reactor batch is used for polymerization of propylene. The separation of the catalyst can be carried out by, e.g., filtering or decanting.

Summarizing what has been stated above, according to one particularly preferred embodiment for modification of Ziegler Natta catalyst in a viscous medium, the modification comprises the steps of introducing a catalyst into the reaction medium;

adding a cocatalyst;

feeding a vinyl compound to the agitated reaction medium at a weight ratio of 0.1 to 1.5 vinyl compound/catalyst;

subjecting the vinyl compound to a polymerization reaction in the presence of said catalyst at a temperature of 35 to 65° C.; and continuing the polymerization reaction until a maximum concentration of the unreacted vinyl compound of less than 2000 ppm, preferably less than 1000 ppm by weight is obtained.

Following the modification of the catalyst with the vinyl compound of the first preferred embodiment of the invention, the catalyst is fed to continuous prepolymerization with propylene and/or other 1-olefin(s) following by polymerization of propylene optionally together with comonomers.

The propylene homo- or copolymer can have a unimodal or bimodal molar mass distribution. Thus, the equipment of the polymerization process can comprise any polymerization reactors of conventional design for producing propylene homo- or copolymers.

For the purpose of the present invention, "slurry reactor" designates any reactor, such as a continuous or simple batch stirred tank reactor or loop reactor, operating in bulk or slurry and in which the polymer forms in particulate form. "Bulk" means a polymerization in reaction medium that comprises at least 60 wt-% monomer. According to a preferred embodiment the slurry reactor comprises a bulk loop reactor. By "gas phase reactor" is meant any mechanically mixed or fluid bed reactor. Preferably the gas phase reactor comprises a mechanically agitated fluid bed reactor with gas velocities of at least 0.2 m/sec.

Thus, the polymerization reactor system can comprise one or more conventional stirred-tank slurry reactors, as described in WO 94/26794, or one or more gas phase reactors. Preferably the reactors used are selected from the group of loop and gas phase reactors and, in particular, the process employs at least one loop reactor and at least one gas phase reactor. This alternative is particularly suitable for producing bimodal polypropylene. By carrying out the polymerization in the different polymerization reactors in the presence of different amounts of hydrogen, the MWD of the product can be broadened and its mechanical properties and processability improved. It is also possible to use several reactors of each type, e.g. one loop reactor and two or three gas phase reactors, or two loops and one gas phase reactor, in series.

A preferred embodiment of the invention comprises carrying out the polymerization in a process comprising loop and gas phase reactors in a cascade where the loop reactor operates in liquid propylene and at high polymerization temperatures. It is possible to have a flash between loop and gas phase reactors. The second polymerization step is made in gas phase reactor(s) in order to broaden the molar mass distribution of the polymer.

In every polymerization step it is possible to use also comonomers selected from the group of ethylene, propylene, butene, pentene, hexene and alike as well as their mixtures.

As pointed out above, the polymerization can be carried out at high polymerization temperatures[00ab] With transesterified high-yield ZN-catalysts, these temperatures will increase the isotacticity of the polymers. At 80 to 90° C., a transesterified catalyst, prepared according to FI 88047, together with a strongly coordinating external donor (dicclopentyl dimethoxysilane) gives high yield and low xylene solubles values of less than 1.5% compared to 2 to 2.5% at 70° C.

In addition to the actual polymerization reactors used for producing the propylene homo- or copolymer, the polymerization reaction system can also include a number of additional reactors, such as pre- and/or postreactors. The prereactors include any reactor for prepolymerizing the modified catalyst with propylene and/or other 1-olefin, if necessary. The postreactors include reactors used for modifying and improving the properties of the polymer product (cf. below). All reactors of the reactor system are preferably arranged in series.

The gas phase reactor can be an ordinary fluidized bed reactor, although other types of gas phase reactors can be used. In a fluidized bed reactor, the bed consists of the formed and growing polymer particles as well as still active catalyst come along with the polymer fraction. The bed is kept in a fluidized state by introducing gaseous components, for instance monomer on such flowing rate which will make the particles act as a fluid. The fluidizing gas can contain also inert carrier gases, like nitrogen and also hydrogen as a modifier. The fluidized gas phase reactor can be equipped with a mechanical mixer.

The gas phase reactor used can be operated in the temperature range of 50 to 115° C., preferably between 60 and 110° C. and the reaction pressure between 5 and 50 bar and the partial pressure of monomer between 2 and 45 bar.

The pressure of the effluent, i.e. the polymerization product including the gaseous reaction medium, can be released after the gas phase reactor in order optionally to separate part of the gaseous and possible volatile components of the product, e.g. in a flash tank. The overhead stream or part of it is recirculated to the reactor.

The propylene homo- or copolymer produced preferably has a MWD of 2 to 20, preferably 3 to 10, and a $MFR_2$ in the range of 0.01 to 1500 g/10 min, preferably 0.05 to 500 g/10 min. The polymer has high stiffness, an increased overall degree of crystallinity and a crystallization temperature measured with DSC of more than 7° C., preferably over 10° C. and in particular 13° C. higher than that of the corresponding non-nucleated polymer. The degree of crystallinity for the propylene homopolymer is generally over 48%, often over 50%, and the elasticity modulus can amount to about 2,000 MPa or more.

If desired, the polymerization product can be fed into a gas phase reactor in which a rubbery copolymer is provided by a (co)polymerization reaction to produce a modified polymerization product. This polymerization reaction will give the polymerization product properties of e.g. improved impact strength. The step of providing an elastomer can be perfomed in various ways. Thus, preferably an elastomer is produced by copolymerizing at least propylene and ethylene into an elastomer. The conditions for the copolymerization are within the limits of conventional EPM production conditions such as they are disclosed, e.g., in Encyclopedia of Polymer Science and Engineering, Second Edition, Vol. 6, p.545–558. A rubbery product is formed if the ethylene repeating unit content in the polymer lies within a certain range. Thus, preferably, ethylene and propylene are copolymerized into an elastomer in such a ratio that the copolymer contains from 10 to 70% by weight of ethylene units. In particular, the ethylene unit content is from 30 to 50% by weight of the amorphous part of the copolymer propylene/ethylene elastomer. In other words, ethylene and propylene are copolymerized into an elastomer in a molar ratio of ethylene-to-propylene of 30/70 to 50/50. Polymers modified by adding the rubbery copolymer in a gas phase reactor are typically called polypropylene block copolymers or heterophasic copolymers.

The elastomer can also be provided by melt blending a ready-made or natural elastomer to the polymer product containing no elastomer made in a postreactor.

The amount of a rubbery component can vary in wide ranges, being preferably about 5 to 30 wt-%, more preferably about 10 to 20 wt-%.

The elasticity modulus of heterophasic copolymers containing about 12 wt-% of a rubbery component is about 1,500 MPa or more.

The present polymerisation product from the reactor(s), so called reactor powder in the form of polypropylene powder, fluff, spheres etc., is normally melt blended, compounded and pelletised with adjuvants, such as additives, fillers and reinforcing agents conventionally used in the art and/or with other polymers. Thus, suitable additives include antioxidants, acid scavengers, antistatic agents, flame retardants, light and heat stabilizers, lubricants, nucleating agents, clarifying agents, pigments and other colouring agents including carbon black. Fillers such as talc, mica and wollastonite can also be used.

Alternatively, the reactor powder can be used without further compounding and pelletisation, that is in "non-pelletized" form. Usually this requires incorporation of some additives, such as antioxidants and acid scavengers, for example through impregnation of the reactor powder with molten or solubilised additives. Alternatively, the impregnated additive can be solid particles dispersed e.g. in water or oil.

This kind of additivation of the reactor powder is known in the art, e.g. EP 0 411 628, but the known technologies have severe limitations as regards nucleation of non-pelletized reactor powder. Impregnation of reactor powder with solubilised, molten or oil-dispersed nucleating agents does not provide the very good distribution of the nucleating agent into the polymer which is a prerequisite for effective nucleation. For example, it is not possible to add well-distributed talc as nucleator to this kind of reactor powder; many known nucleating agents, such as sorbitol derivatives, have too high melting or solubilising temperature for use use in impregnation processes. In the prior art, an effective melt mixing stage is needed to get a good nucleation effect.

Surprisingly we have found that using a catalyst modified with the polymerised vinyl compounds according to the present invention, the reactor powder is inherently nucleated, and a good nucleation effect is created to PP even without pelletization, i.e. effective melt mixing stage. The good nucleation effect can be seen by DSC analysis from clearly increased temperature of a crystallisation exotherm peak. The shape of the peak should also be uniform, no "shoulders" etc.

The colouring agent used in the present invention can be any colouring pigment, organic or inorganic. As explained in more detail in our copending patent application, by dominating the nucleating effect, if any, of the pigment, the nucleated propylene homo- or copolymer will provide a controlled and predictable shrinkage irrespective of the pigment. Examples of colouring pigments are white pigments, such as titanium dioxide, yellow/orange pigments such as isoindolinone or azocondensation, red/violet such as quinacridone or diketo pyrrolo pyrol, blue/green pigments such as ultramarine blue or Cu Phtalocyanine blue, and black pigments such as carbon black. Pigments giving a tint (translucent moulded products) can also be considered. The amount of pigments is usually 0.01 to 5% by weight of the polypropylene component.

According to a preferred embodiment, the present propylene polymers are blended and optionally compounded with a propylene polymer manufactured with an unmodified catalyst, or with another polymer, in particular a polyolefin selected from the group of LD-, LLD-, MD- and HD-polyethylenes and polybutylene.

The reinforcing agents suitable for use in the present invention can be selected from chopped or continuous glass fibres, carbon fibres, steel fibres and cellulose fibres.

With reference to the fillers, as described in our copending patent application, the addition of talc in amounts of 0.1 to 10 wt-% will provide particularly interesting advantages. Thus, it increases the stiffness of the propylene polymer composition by up to 5%. Talc in polypropylene compositions gives rise to higher tensile modulus than talc in standard PP copolymer. The Heat Deflection Temperature (HDT) is also increased by the addition of talk, and the HDT value increases more for the present polypropylene compositions nucleated with a vinyl compound than for standard PP. The crystallization temperature of the present compositions is higher than for standard PP containing corresponding amounts of talc and for polypropylene compositions nucleated with a vinyl compound. Although the shrinkage of the present compositions is somewhat higher that that of standard PP containing talc it is still within the tolerance limits and the present invention provides a unique combination of excellent stiffness, controlled shrinkage and high $T_{cr}$ giving good cyclus potential.

The present blends can be produced by methods known per se, e.g. by mixing the polymer components with the talc in the desired weight relationship using a batch or a continuous process. As examples of typical batch mixers, the Banbury and the heated roll mill can be mentioned. Continuous mixers are exemplified by the Farrel mixer, the Buss co-kneader, and single- or twin-screw extruders.

The homopolymer or copolymer composition thus obtained can be used for the manufacture of moulded and extruded articles, in particular articles processed by injection moulding, compression moulding, thermoforming, blow moulding or foaming. The present polymers are useful for preparing pipes, cables, sheets or films as well as for manufacturing cups, pails, bottles, containers, boxes, automotive parts, appliances, technical articles, caps, closures and lids.

The following non-limiting examples illustrate the invention.

EXAMPLE 1

The catalyst modification was made in a 5.0 dm³ reactor. A mixture of Ondina Oil 68 N (Shell) and Vaseline Grease SW (Fuchs Lubrificanti S.R.L) was used as catalyst modification medium. The oil-grease mixture was made separately. This mixture was heated up to 70° C., vaccumed and nitriged.

The oil-grease mixture, 700 ml was first poured into the reactor. The reactor was closed and pressure tested. The agitator was turned on and the oil-grease mixture was carefully vaccumed and nitriged several times.

A third of the cocatalyst and 100% triethylaluminium (TEA) was fed into the reactor. The temperature was 30° C. The catalyst used was a highly active and stereospecific Ziegler Natta—catalyst (ZN-catalyst) made according to Finnish patent No. 88047. The dry catalyst, 175 g was fed slowly into the reactor. After that the remaining ⅔ of the TEA was added. Thee total Al/Ti mole ratio was 2.

The catalyst reacted for 10 to 15 min with the aluminium alkyl compound and with the donor in the mud before starting the vinylcyclohexane (VCH) feed. A VCH/catalyst weight ratio of 1/1 was used. The reaction time (modification time) was 180 min. at a temperature of 50°.

After catalyst modification the reactor was cooled down to room temperature and samples for test polymerization, and viscosity & density measurements were taken.

1.1. Viscosity of the Catalyst Mud

Viscosity of the modified catalyst mud was measured at 10° C. with Brookfield DV II viscometer (spindle 7, speed 100 rpm). The accuracy of the viscosity measurement is ±0.5 Pa s. The viscosity was 7.2 (Pa s).

1.2. Density of Catalyst Mud

Density of the modified catalyst mud was measured by using a 25 ml flask bottle. The accuracy of the density measurement is ±0.05 g/ml. The density of the catalyst mud was 0.88 g/ml.

1.3. Unreacted VCH

To able to study that how much modified catalyst contains unreacted monomer, the VCH content of the catalyst was analyzed immediately after modification by the GC-method. The VCH content of the modified catalyst mud was 960 wt-ppm.

1.4. Polymerization of Propylene

The test polymerization was carried out in a 2,0 dm³ laboratory autoclave equipped with a stirrer. 1 dm³ of propylene was first fed into reactor as polymerization diluent and monomer. Propylene was purified before polymerization with aluminium oxide and with three purification catalysts.

In separate vessel, 30 ml of heptane, about 0.68 ml triethylaluminium (TEA) and about 0.05 ml of cyclohexyl-methyldimethoxysilane (CHMMS) were taken, and these substances were reacted with each other for about 5 min with intermittent stirring. Then 15 ml of TEA-donor-heptane solution was taken from the vessel and added upon the modified catalyst on a septume flask which, with the suspension formed, is agitated. The rest of the TEA-donor-heptane solution was fed into the reactor. The catalyst suspension was carefully introduced into the reactor and polymerization was then initiated by first feeding hydrogen into the reactor and then the temperature was increased. The pressure was allowed to rise to up to 40 bar and the temperature to 70° C. within 15 minutes. The rotational speed of the stirrer was increased to about 600 l/min. The polymerization of propylene continued for 1 h.

EXAMPLE 2

As Example 1 but:

pentane was used as a catalyst modification diluent;

all the TEA was fed to the reactor before the catalyst;

Al/Ti mole ratio was 5;

an external donor, cyclohexyl methyldimethoxysilane (CHMMS) was fed to the reactor after the TEA, the TEA Al/donor mole ratio was 5;

catalyst modification time was 1260 minutes;

catalyst modification temperature was 40° C.

EXAMPLE 3

The procedure of Example 1 was repeated with the exception that:

a metallocene catalyst (single site catalyst, SSC), rac-dimethylsilanediyl-bis -1,1'-(2-methyl-4-phenylindenyl)zirconium dichloride and methylaluminoxane supported on porous $SiO_2$, was used.

no external cocatalyst or donor was fed.

VCH/catalyst weight ratio was 0.4.

catalyst modification temperature was 35° C.

catalyst modification time was 1440 minutes.

EXAMPLE 4

As Example 1 but:

prepolymerization was scaled up in a 100 $dm^3$ reactor.

cocatalyst (TEA) was fed after the catalyst feed.

VCH/catalyst weight ratio was 0,75.

catalyst modification time was 360 minutes.

Catalyst modification conditions, test polymerization results (polymerization of propylene) and product characteristics are shown in Table 1. The corresponding data for unmodified catalysts are shown in Table 2 for reference.

The following test methods were used in the following tables and examples:

$MFR_2$: ISO 1133 Standard, at 230° C., using 2.16 kg load

HDT (heat deflection temperature): ISO 75-2, method B/0,45MPa

Charpy : ISO 179/at room temperature (if no other T mentioned)

Flexural modulus: ISO 178/at room temperature (if no other T mentioned)

Tensile modulus and tensile strength: ISO 527-2

SHI (the shear thinning index) (0/50): is defined as a ratio of the zero shear viscosity h0 to the viscosity $G^*=50$ kPa. SHI is a measure of molecular weight distribution.

XS: Polymer solubles in xylene at 25° C., measured by dissolving the polymer in xylene at 135° C., and allowing the solution to cool to ° C. and filtering then the insoluble part out.

AM: Amorphous part, measured by separating the above xylene soluble fraction and precipitating the amorphous part with acetone.

Thermal properties:

Melting temperature, $T_m$, crystallisation temperature, $T_{cr}$, and the degree of crystallinity were measured with Mettler TA820 differential scanning calorimetry (DSC) on 3±0.5 mg samples. Both crystallisation and melting curves were obtained during 10° C./min cooling and heating scans between 30° C. and 225° C. Melting and crystallisation temperatures were taken as the peaks of endotherms and exotherms. The degree of crystallinity was calculated by comparison with heat of fusion of a perfectly crystalline polypropylene, ie., 209 J/g.

TABLE 1

The catalyst modification conditions, and test polymerization results (polymerization of propylene)

| | 1 | 2 | 3 | 4 |
|---|---|---|---|---|
| CATALYST MODIFICATION | | | | |
| Catalyst type | ZN 1 | ZN 1 | SSC | ZN 2 |
| Al/Ti, (mol/mol) | 2 TEA 1/3 + 2/3 | 5 TIBA | — | 2 TEA AFTER CAT FEED |
| Al/Don, (mol/mol) | — | 5 CHMMS | — | — |
| VCH/Catalyst, (g/g) | 1/1 | 1/1 | 0.4/1 | 0.75/1 |
| C (not modified catalyst), g cat/$dm^3$ cat-oil-grease | 184 | pentane | 50 | 130 |
| C (modified), g cat/$dm^3$ cat-oil-grease | 368 | pentane | 70 | 260 |
| Oil/Grease, (g/g) | 3/1 | — | 1.75/1 | 3/1 |
| Oil-Grease/Cat [ml (70° C.)/g] | 4.00 | — | 80 | 4.2 |
| Modification time, (min) | 180 | 1260 | 1440 | 360 |
| Modification temp, (° C.) | 50 | 40 | 35 | 50 |
| Viscosity, (Pa s) | 12.6 | nm. | 11.5 | 8.9 |
| Density, (g/ml) | 0.960 | nm | 0.91 | 0.950 |
| POLYMERIZATION OF PROPYLENE | | | | |
| Activity, kg PP/g Cat (1 h) | 31.1 | 30.2 | 4.6 | 39.2 |
| Isotactisity, II (%)* | 96.5 | 96.4 | 99.0 | 96.5 |
| $MFR_2$, (g/10 min) | 5.2 | 7.7 | 72 | 3.2 |
| Crystallization temperature, Tcr (° C.) | 125.9 | 124.3 | 122.7 | 124.4 | nm. = not measured
*insolubles in boiling n-heptane

TABLE 2

Data for unmodified catalysts

| Catalyst before modification | ZN 1 | ZN 2 | SSC |
|---|---|---|---|
| Activity, kg PP/g cat (1 h) | 30.1 | 32.4 | 5.0 |
| Isotacitisty, % | 97.7 | 98.5 | 99.0 |
| $MFR_2$, g/10 min | 4.9 | 3.8 | 70.0 |
| Crystallization temperature; Tcr (° C.) | 112.6 | 113.4 | 112.7 |

COMPARATIVE EXAMPLE

The purpose of the following example is to show that the amount of VCH residues are high if the VCH/catalyst ratio is too high and the modification time and temperature are relatively low (cf. Example 4 of EP 0 607 703).

Test catalyst 3.5 g(Ti 1.7%)

wax/oil 200 ml~180 g

VCH/cat 3 weight ratio→10,5 g VCH

TEA 0.850 ml

Donor C, 0.124 ml

Heptane 0.720 ml

Catalyst concentration ~17.3 g/l

Al/Ti 5

Al/Do 10

The modification time with VCH was 6.0 h, the temperature was 38° C. The VCH content of the catalyst was analyzed immediately after modification by the GC-method. The VCH concentration after modification was 4.75 wt-%.

EXAMPLE 5

A high yield $MgCl_2$ supported $TiCl_4$ Ziegler-Natta catalyst prepared according to Finnish Patent No. 88047 was dispersed into a mixture of oil and grease (Shell Ondina Oil N 68 and Fuchs Vaseline Grease SW in 2:1 oil-to-grease volume ratio). The titanium content of the catalyst was 2.5 wt-%, and the concentration of the catalyst in the oil/crease mixture was 15 g cat/dm³.

Triethylaluminium (TEAL) was added to the catalyst dispersion in a TEAL to titanium mole ratio of 1.5. After that vinylcyclohexane (VCH) was added to the reaction mixture, and the VCH to catalyst weight ratio was 1:1. The reaction mixture was mixed at a temperature of 55° C. until the concentration of unreacted VCH in the reaction mixture was 1000 ppm by weight.

EXAMPLE 6

Propylene homopolymers were produced in a pilot plant having a prepolymerization reactor, a loop reactor and a fluid bed gas-phase reactor connected in series. The catalyst used in the polymerizations was a VCH-modified Ziegler Natta catalyst prepared similarly to Example 6, the cocatalyst was triethylaluminum, TEA, and as an external electron donor dicyclopentyl dimethoxy silane, D, was used.

The VCH-modified catalyst, TEA and the donor were fed to the prepolymerization reactor for prepolymerization with propylene. After the prepolymerization step the catalyst, TEA and the donor were transferred to the loop reactor where the polymerization in liquid propylene took place. From the loop reactor the polymer was transferred to the gas phase reactor without flashing the non-reacted monomer and hydrogen between the reactors. Polymerization was continued in the gas phase reactor to which additional propylene and hydrogen were fed.

The polymerization temperature in the loop and in the gas phase reactors was 70° C. The hydrogen feed was adjusted such that the polymer in the loop reactor had an $MFR_2$ of 0.04 g/10 min and in the gas phase reactor an $MFR_2$ amounting to 3.4 g/10 min. The production rate ratio between loop and the gas phase reactor was 45/55.

The properties of the polymers made as described above are summarized in Table 3.

TABLE 3

| Properties of the polymers | | |
|---|---|---|
| | | Example 7 |
| $MFR_2$ | g/10 min | 3.4 |
| XS | % | 1.5 |
| Tm | ° C. | 166.1 |
| Tcr | ° C. | 126.1 |
| Crystallinity | % | 53.3 |
| Zero viscosity | Pas | 18,000 |
| SHI (0/50) | | 19 |
| Tensile strength | MPa | 39.4 |
| Tensile modulus | MPa | 2,070 |
| Flexural modulus | MPa | 1,950 |
| Charpy, notched | kJ/m² | 4.4 |
| HDT (0.45 MPa) | ° C. | 110 |

EXAMPLE 7

Catalyst Modification with Polymerisation of Vinylcycloalkane:

A high yield $MgCl_2$ supported $TiCl_4$ Ziegler-Natta catalyst prepared according to Finnish Patent No. 88047 was dispersed into a mixture of oil and grease (Shell Ondina Oil N 68 and Fuchs Vaseline Grease SW in 3.2:1 oil/grease volume ratio). The titanium content of the catalyst was 2.5 wt-%, and the concentration of the catalyst in the oil/crease mixture was 189 g cat/dm³.

Triethylaluminium (TEAL) was added to the catalyst dispersion in a TEAL to titanium mole ratio of 1.5. After that vinylcyclohexane (VCH) was added to the reaction mixture, and the VCH to catalyst weight ratio was 1:1. The reaction mixture was mixed at a temperature of 55° C. until the concentration of unreacted VCH in the reaction mixture was 1000 ppm by weight.

EXAMPLE 8

Copolymerisation of Propylene and Ethylene

The modified catalyst in the oil-grease mixture (catalyst mud) obtained from Example 8 was continuously fed to process consisting from a loop rector and a fluid bed gas phase rector together with TEAL, dicyclopentyldimethoxysilane and propylene.

The TEAL and dicyclopentyldimethoxysilane at a weigth-to-weigth ratio of 3.2 was contacted before mixing with the catalyst mud. After that the mixture was flushed with propylene, containing the desired amount of hydrogen as molecular weight regulating agent, to a continuous stirred prepolymerisation reactor. After the prepolymerisation, the reaction mixture together with additional propylene and hydrogen was fed to a continuous loop reactor operating at 68° C. The obtained PP homopolymer-propylene slurry containing the catalyst was continuously recovered from the loop reactor to a flashing unit where the liquid propylene was vaporised and the remaining solid polymer particles, containing the active modified catalyst, was further fed to a continuous fluidised bed gas phase reactor where a rubbery propylene ethylene copolymer for impact modification was produced. The gas phase reactor was operated at 77° C. The desired amount of propylene and ethylene was continuously fed to the reactor, and the molecular weight of the copolymer produced was controlled with desired amount of hydrogen. The final polymer was continuously recovered from the gas phase reactor. After purging the unreacted monomers, the required stabilisers and other additives were added and the polymer powder was pelletised with an extruder.

The final polymer had an MFR$_2$ of 15 g/10 min, and an ethylene content of 8 wt-%. The amount of polymer precipitated with acetone from solubles in 23° C. xylene was 13.9 wt-%, which corresponds to the amount of rubbery copolymer made in the gas phase reactor. The MFR$_2$ of the polymer recovered from the loop reactor was 20 g/10 min. The ethylene content of the polymer precipitated with acetone from solubles in 23° C. xylene was 37.4 wt-%.

EXAMPLE 9

A TiCl$_3$ catalyst was modified with VCH in heptane slurry at 25° C. on laboratory scale. Polymerization of the modified catalyst was carried out in heptane slurry in a 2 dm$^3$ bench scale reactor at a temperature of 70° C. and a pressure of 7 bar.

The results will appear from Table 4 below:

TABLE 4

| Modification of TiCl$_3$ catalyst | |
|---|---|
| Catalyst | TiCl$_3$ |
| Cocatalyst | diethylaluminium chloride |
| Donor | no |
| Modification | |
| heptane | 15 ml |
| Al/Ti, mole ratio | 5 |
| VCH/catalyst, g/g | 0.5 |
| VCH reaction time, h | 24 |
| VCH content after treatment, w-% | 0.19 |
| Polymerization | |
| Al/Ti, mole ratio | 5 |
| Activity, kg/g, 3 h polymerization | 0, 8 |
| T$_{cr}$, ° C. | 130.0 |

*prepolymerized with propylene 1/1 (Ti-content 15.7%)
T$_{cr}$ without modification 110–112° C., activity on the same level

EXAMPLE 10

Preparation of Propylene Homopolymer in Non-pelletized Form

Polypropylene homopolymer, with a MFR$_2$ of 2, made according to the present invention had a crystallisation temperature (T$_{cr}$) of 128.3° C. in a non-pelletized reactor powder form. A compounded and pelletized sample made from the same polypropylene homopolymer showed a T$_{cr}$ of 128.8° C. I.e. crystallization temperatures of the non-pelletized and pelletized polymers were essentially the same. As a comparison of propylene homopolymers, with a MFR$_2$ of 2, reactor powder made with unmodified catalysts had a T$_{cr}$ of 110.8° C. All the samples were determined with the same DSC instrument and the same temperature program and for all samples the crystallisation peak consisted of a single peak.

What is Claimed is:

1. A process for producing a propylene polymer nucleated with a polymeric nucleating agent containing vinyl compound units, comprising the steps of
   modifying a catalyst
   by polymerizing a vinyl compound of the formula

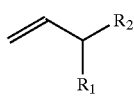

wherein R$_1$ and R$_2$ together form a 5 or 6 membered saturated or unsaturated or aromatic ring at a weight ratio of the vinyl compound to the catalyst amounting to 0.1 to below 3, in the presence of said catalyst,
   by carrying out the modification in a medium which does not dissolve the polymerized vinyl compound and
   by continuing the polymerization of the vinyl compound until the concentration of unreacted vinyl compounds is less than about 0.5 wt-%,
   to produce a modified catalyst composition, said modification being carried out before any prepolymerization step of the catalyst with an olefinic monomer, and
   polymerizing propylene optionally together with comonomers in the presence of said modified catalyst composition.

2. The process according to claim 1, wherein the vinyl compound is selected from the group consisting of vinyl cycloalkanes, styrene, p-methyl-styrene, and mixtures thereof.

3. The process according to claim 1 or 2, wherein the catalyst is selected from the group of catalyst compositions containing a transition in a metal compound as a procatalyst component.

4. The process according to claim 3, wherein the transition metal compound is selected from the group of titanium compounds having an oxidation degree of 3 or 4, vanadium compounds, zirconium compounds, chromium compounds, cobalt compounds, nickel compounds, tungsten compounds and rare earth metal compounds.

5. The process according to claim 4, wherein the titanium compound is TiCl$_3$ or TiCl$_4$.

6. The process according to claim 3, wherein the procatalyst component is supported on an inert organic or inorganic compound.

7. The process according to claim 3, wherein the catalyst composition comprises a cocatalyst which is at least one selected from the group consisting of aluminum compounds, alkaline metal compounds and alkaline earth metal compounds.

8. The process according to claim 7, wherein the cocatalyst is selected from the group of Al-trialkyls, Al-alkyl halides, Al-alkoxides, Al-alkoxy halides and Al-halides.

9. The process according to claim 3, wherein the catalyst comprises an electron donor.

10. The process according to claim 9, wherein the electron donor has the general formula of

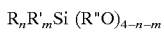

wherein R' and R can be the same or different and represent linear, branched or cyclic aliphatic, or aromatic groups, R" is methyl or ethyl, and n and m are o or 1 and n+m is 1 or 2.

11. The process according to claim 10, wherein the electron donor is selected from the group consisting of dicyclopentyldimethoxy silane, di-tert-butyldimethoxy silane, methyl cyclohexyldimethoxy silane, diisopropyldimethoxy silane and diisobutyldimethoxy silane.

12. The process according to claim 3, wherein the electron donor has the general formula of

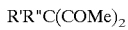

wherein R' and R" are the same or different and stand for a branched aliphatic or cyclic or aromatic group.

13. The process according to claim 1 or 2, wherein the catalyst comprises a metallocene catalyst.

14. The process according to claim 13, wherein the metallocene catalyst comprises: a metallocene/activator reaction product impregnated into a porous support using an amount of metallocene/activator reaction product and a solvent, which corresponds to a maximum pore volume of the porous support; a bridged catalyst complex; a catalytic metal halide; and an aluminum alkyl.

15. The process according to claim 13, wherein the metallocene catalyst comprises a metallocene compound which is a bridged bis(2-R-4-R'-indenyl)MCl$_2$, wherein both R and R' are aliphatic, cycloaliphatic or aromatic hydrocarbons having 1 to 18 C atoms, M is a transition metal, and R and R' optionally contain heteroatoms, and the bridge between the indenyls comprises 1 to 3 atoms.

16. The process according to claim 14, wherein the metallocene compound is dimethylsilyl-bis(2-methyl-4-phenyl-indenyl)zirconiumdichloride or dimethylsilyl-bis(2-methyl-4,5-benzylindenyl) zirconiumdichloride.

17. The process according to claim 1, wherein the catalyst modification is carried out in a medium which is at least one selected from the group consisting of isobutane, propane, pentane, hexane and a viscous substance, which is inert to reactants.

18. The process according to claim 17, wherein the viscous substance comprises a viscous substance having a viscosity of 1,000 to 15,000 cP at room temperature.

19. The process according to claim 18, wherein the viscous substance comprises an oil optionally mixed with a solid or highly viscous substance.

20. The process according to claim 19, wherein the oil comprises a poly-alpha-olefin oil.

21. The process according to claim 19 or 20, wherein the solid or highly viscous substance comprises a grease or a wax.

22. The process according to claim 1, wherein the catalyst modification is carried out by
    introducing a catalyst into the reaction medium;
    adding a cocatalyst;
    feeding a vinyl compound to the agitated reaction medium at a weight ratio of 0.1 to 2 vinyl compound/catalyst;
    subjecting the vinyl compound to a polymerization reaction in the presence of said catalyst at a temperature of 35 to 65° C.; and
    continuing the polymerization reaction until a maximum concentration of the unreacted vinyl compound of less than 2000 is obtained.

23. The process according to claim 1, wherein the modified catalyst composition is fed together with a portion of the reaction medium into a polymerization reactor.

24. The process according to claim 1, wherein propylene is polymerized by subjecting propylene and optionally other olefins to polymerization in a plurality of polymerization reactors connected in series.

25. The process according to claim 1, wherein polymerization is carried out in at least one reactor selected from the group of slurry and gas phase reactors.

26. The process according to claim 1, wherein propylene is polymerized in a reactor cascade comprising at least one loop reactor and at least one gas phase reactor.

27. The process according to claim 26, wherein different amounts of hydrogen are employed as molar mass modifiers in at least two of the reactors, to provide a high molar mass polymerization product and a low or medium molar mass polymerization product.

28. The process according to any of claims 25 to 27, wherein the slurry reactor is operated at a polymerization temperature of 60 to 110° C.

29. The process according to claim 1, wherein the polymerization product of the gas phase reactor is fed into a further reactor in which the polymerization product is combined with an elastomer to produce a modified polymerization product.

30. The process according to claim 29, wherein the modified polymerization product exhibits properties of improved impact strength.

31. The process according to claim 29 or 30, wherein the elastomer is produced by copolymerizing propylene and ethylene into an elastomer in such a ratio that the amorphous fraction of the propylene/ethylene copolymer contains from 10 to 70% by weight of ethylene units.

32. The process according to claim 1, wherein a propylene polymer is prepared having a Melt Flow Rate (MFR$_2$) of 0.01 to 1500 g/10 min and a T$_{cr}$ of over 7° C. higher than the T$_{cr}$ of the corresponding non-nucleated polymer.

33. The process according to claim 1, wherein the amount of unreacted vinyl compounds in the propylene (co)polymer is below the limit of determination with a GC-MS method.

34. The process according to claim 1, wherein the propylene polymer is blended and optionally compounded with adjuvants selected from the group of additives, fillers, reinforcing agents and other polymers.

35. The process according to claim 34, wherein the propylene polymer is blended with additives in non-pelletized form.

36. The process according to claim 35, wherein the propylene polymer in the form of a reactor powder is blended with additives by impregnating the powder with molten, solubilized or dispersed additives.

37. The process according to claim 34, wherein the propylene polymer is blended and optionally compounded with a propylene polymer manufactured with an unmodified catalyst.

38. The process according to any of claims 34 to 37, wherein the additives are selected from the group of antioxidants, acid scavengers, antistatic agents, flame retardants, light and heat stabilizers, lubricants, nucleating agents, clarifying agents, pigments and colouring agents including carbon black.

39. The process according to claim 34, wherein the fillers are selected from the group of mica, calcium, carbonate, talc and wollastonite.

40. The process according to claim 34, wherein the polymer is blended with another polymer.

41. The process according to claim 34, wherein the reinforcing agents is selected from the group of chopped or continuous glass fibres, carbon fibres, steel fibres and cellulose fibres.

42. A proces for preparing polymer articles by moulding or extruding a polymer prepared according to the process of claim 1.

43. The process according to claim 42, wherein the moulding is injection moulding, compression moulding, thermoforming, blow moulding or foaming.

44. The process according to claim 42 or 43, wherein the polymer articles are pipes, cables, sheets or films.

45. The process according to claim 42 or 43, wherein the polymer articles are at least one selected from the group consisting of cups, pails, bottles, boxes, containers, automotive parts, appliances, technical articles, caps, closures or lids, pipes and cables.

46. The process according to claim 6, wherein the inorganic compound is a metal oxide or metal halide.

47. The process according to claim 15, wherein R' is selected from the group consisting of benzyl, phenyl and naphthyl and R is a lower alkyl.

48. The process according to claim 22, wherein the feeding of a vinlyl compound to the agitated reaction medium is at a weight ratio of 0.1 to 1.5 vinyl compound/catalyst.

49. The process according to claim 22, wherein the polymerization reaction is continued until a maximum concentration of the unreacted vinyl compound is less than 1000 ppm by weight.

50. The process according to claim 2, wherein the vinyl cycloalkane is at least one selected from the group consisting of vinyl cyclohexane, vinyl cyclopentane, vinyl-2-methyl cyclohexane and vinyl norbornane.

51. The process according to claim 1, further comprising a step of forming the polymer into a pipe, a cable, a sheet or a film.

52. The process according to claim 1, further comprising a step of forming the polymer into a cup, a pail, a bottle, a box, a container, an automotive part, an appliance, a technical article, a cap, a closures or a lid.

* * * * *